United States Patent
You et al.

(10) Patent No.: US 8,223,960 B2
(45) Date of Patent: Jul. 17, 2012

(54) APPARATUS AND METHOD FOR REMOVING AN ECHO SIGNAL IN A SIGNAL TRANSMISSION/RECEPTION APPARATUS OF A COMMUNICATION SYSTEM

(75) Inventors: Hwa-Sun You, Suwon-si (KR); Hee-Won Kang, Seongnam-si (KR); Jae-Bum Kim, Seoul (KR); Jung-Woo Ku, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 704 days.

(21) Appl. No.: 12/328,738

(22) Filed: Dec. 4, 2008

(65) Prior Publication Data

US 2009/0147964 A1    Jun. 11, 2009

(30) Foreign Application Priority Data

Dec. 7, 2007 (KR) ........................ 10-2007-0127178

(51) Int. Cl.
*H04M 9/08* (2006.01)
*H04B 7/14* (2006.01)
*H04B 1/44* (2006.01)
*H04B 3/20* (2006.01)

(52) U.S. Cl. .......... 379/406.1; 455/24; 455/78; 370/286

(58) Field of Classification Search ............ 379/406.01–406.16; 370/286–292; 455/63.1, 570

See application file for complete search history.

(56) References Cited

U.S. PATENT DOCUMENTS

| 6,384,858 | B1 * | 5/2002 | Limberg ........................ 348/21 |
| 2002/0032004 | A1 * | 3/2002 | Widrow ......................... 455/22 |
| 2002/0172213 | A1 * | 11/2002 | Laroia et al. .................. 370/430 |
| 2003/0072363 | A1 * | 4/2003 | McDonald et al. ........... 375/232 |
| 2005/0215193 | A1 * | 9/2005 | Kummetz ........................ 455/1 |

FOREIGN PATENT DOCUMENTS

| JP | 2006-148375 A | 6/2006 |
| KR | 10-2005-0011661 A | 1/2005 |
| KR | 10-2006-0062761 A | 6/2006 |
| WO | 2005/008916 A1 | 1/2005 |

* cited by examiner

*Primary Examiner* — Fan Tsang
*Assistant Examiner* — Jeffrey Lytle
(74) *Attorney, Agent, or Firm* — Jefferson IP Law, LLP

(57) ABSTRACT

A method and apparatus for removing an echo signal in a signal transmission/reception apparatus of a communication system are provided. A signal transmission/reception apparatus determines an echo channel impulse response using a reception signal, generates an echo signal removing coefficient using the echo channel impulse response, removes an echo signal from the reception signal using the echo signal removing coefficient, and transmits a signal in which the echo signal is removed.

12 Claims, 4 Drawing Sheets

APPARATUS AND METHOD FOR REMOVING AN ECHO SIGNAL IN A SIGNAL TRANSMISSION/RECEPTION APPARATUS OF A COMMUNICATION SYSTEM

PRIORITY

This application claims the benefit under 35 U.S.C. §119(a) of a Korean patent application filed in the Korean Intellectual Property Office on Dec. 7, 2007 and assigned Serial No. 10-2007-0127178, the entire disclosure of which is hereby incorporated by reference.

BACKGROUND OF THE INVENTION

1. Field of the Invention

The present invention relates to an apparatus and method for transmitting/receiving a signal in a signal transmission/reception apparatus of a communication system. More particularly, the present invention relates to an apparatus and method for transmitting/receiving a signal after removing an echo signal in a signal transmission/reception apparatus of a communication system.

2. Description of the Related Art

In a conventional communication system, a signal is transmitted/received through a direct link between a Base Station (BS) and a Mobile Station (MS). More specifically, a BS provides service to the MS when the MS is in the service coverage area of the BS. However, in the conventional communication system, a location of the BS is fixed. Accordingly, it is difficult to supply an effective communication service when the MS enters a shadow region in the service coverage area or when there is severe variation of a channel state. In the conventional communication system, one method of addressing this problem is to install a Relay Station (RS). A Relay Station (RS) is provided between the BS and the MS and is used for amplifying the BS signal and therefore extends the service coverage area of the BS.

The conventional communication system can extend a cell service area and provide a channel with an improved channel state to an MS using the RS. Further, the BS can provide a faster data channel to an MS using the RS in a cell boundary region having a degraded channel state.

FIG. 1 is a diagram illustrating a structure of a conventional communication system using an RS.

Referring to FIG. 1, the conventional communication system includes a BS 110, an RS 130, and an MS 150.

The BS 110 can transmit a data signal to the MS 150 either directly or using the RS 130. Similarly, the MS 150 can transmit a data signal to the BS 110 either directly or using the RS 130.

The RS 130 amplifies a signal received from the BS 110, and transmits the amplified signal to the MS 150. The RS 130 also amplifies a signal received from the MS 110, and transmits the amplified signal to the BS 150. Further, the RS 130 includes at least one antenna for transmitting/receiving a signal.

In FIG. 1, it will be assumed that the RS 130 includes two antennas, i.e., a transmission antenna for transmitting a signal and a reception antenna for receiving a signal.

When the RS 130 transmits a signal, the signal transmitted through the transmission antenna can be received through the reception antenna. That is, the signal transmitted through the transmission antenna can flow into the RS 130 along with a signal received through the reception antenna. If the signal transmitted through the transmission antenna flows into the RS 130 along with the signal received through the reception antenna, the signal transmitted through the transmission antenna that flows into the reception antenna will be called an "echo signal".

When the echo signal is received, it causes oscillation in the RS 130. Also, the intended signal received through the reception antenna is distorted due to receipt of the echo signal in the RS 130. Accordingly, when the signal received through the reception antenna is distorted, the quality of a signal transmitted by the RS 130 is decreased.

Therefore, there is a need for a signal transmission/reception apparatus that removes an echo signal in order to prevent the quality of a transmission signal from decreasing due to an echo signal in the conventional communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for removing an echo signal in a signal transmission/reception apparatus of a communication system.

Another aspect of the present invention is to provide an apparatus and method for removing an echo signal in order to prevent a decrease in quality of a transmission signal in a signal transmission/reception apparatus of a communication system.

Yet another aspect of present invention is to provide an apparatus and method for transmitting/receiving a signal after removing an echo signal in a signal transmission/reception apparatus of a communication system.

In accordance with an aspect of the present invention, a method for removing an echo signal in a signal transmission/reception apparatus of a communication system is provided. The method includes determining an echo channel impulse response using a reception signal, generating an echo signal removing coefficient using the echo channel impulse response, generating a transmission signal by removing an echo signal from the reception signal using the echo signal removing coefficient, and transmitting a signal in which the echo signal is removed.

In accordance with another aspect of the present invention, an apparatus for removing an echo signal in a signal transmission/reception apparatus of a communication system is provided. The apparatus includes a receiver for receiving a signal, an echo signal removing coefficient calculator for calculating an echo channel impulse response using the received signal and for generating an echo signal removing coefficient using the echo channel impulse response, an echo signal remover for removing an echo signal from the received signal using the echo signal removing coefficient, and a transmitter for transmitting a signal in which the echo signal is removed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for removing an echo signal in a signal transmission/reception apparatus of a communication system. Furthermore, exemplary embodiments of the present invention provide an apparatus and method for removing an echo signal in order to prevent a decrease in quality of a transmission signal in a signal transmission/reception apparatus of a communication system. Further, exemplary embodiments of the present invention provide an apparatus and method for transmitting/receiving a signal after removing an echo signal in a signal transmission/reception apparatus of a communication system.

In the following description, it will be assumed that the signal transmission/reception apparatus of a communication system uses two antennas, i.e., a transmission antenna and a reception antenna. However, it is to be understood that this is merely for ease of description and the signal transmission/reception apparatus of the present invention can use any number of antenna for transmitting/receiving a signal.

Furthermore, although a description of exemplary embodiments of the present invention will be given herein with reference to a Relay Station (RS) as an example of the signal transmission/reception apparatus, the present invention can be used not only in the RS but also in other signal transmission/reception apparatus in which an echo signal may occur. Herein, the RS relays signals between a Base Station (BS) and a Mobile Station (MS).

Figure 1:
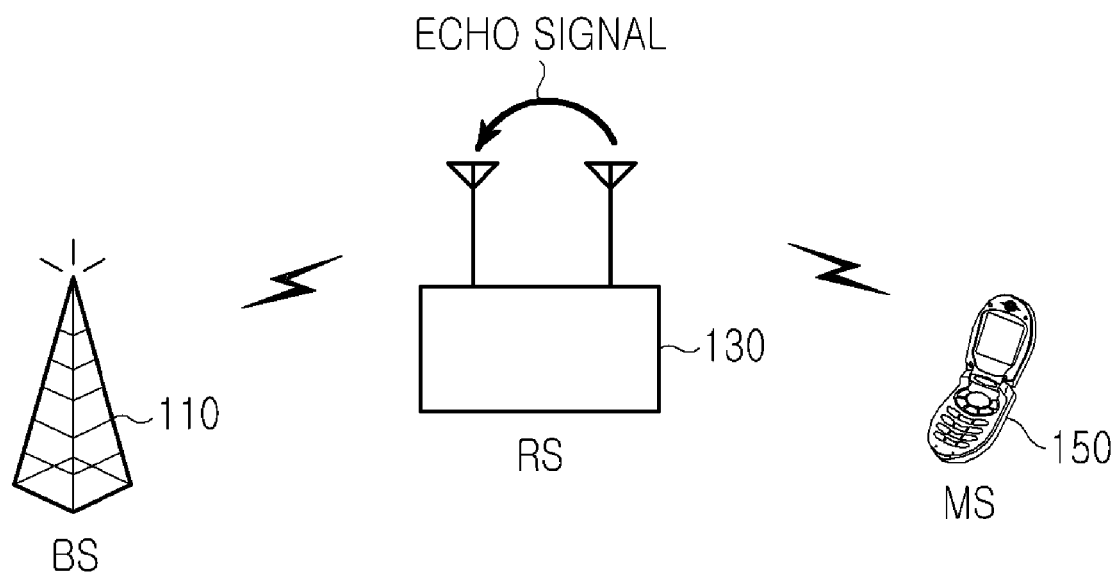
FIG. 1 is a diagram illustrating a structure of a conventional communication system using an RS.

As a preliminary matter, it is understood that an overall structure of a communication system according to an exemplary embodiment of the present invention is identical to the overall structure of the communication system illustrated in FIG. 1. Accordingly, a detailed description thereof will be omitted herein.

Figure 2:
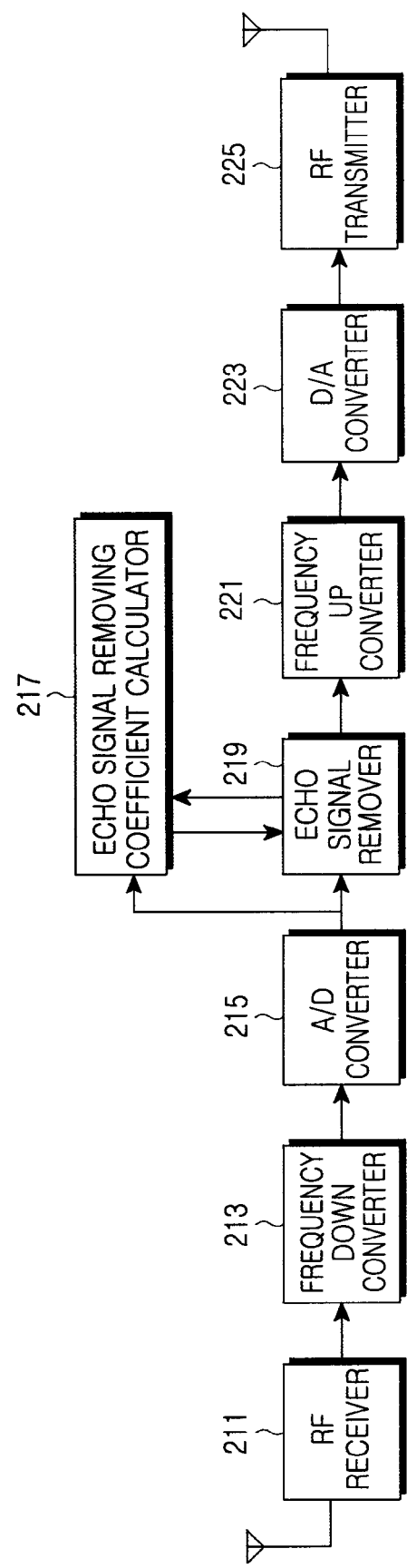
FIG. 2 is a diagram illustrating a structure of a signal transmission/reception apparatus of a communication system according to an exemplary embodiment of the present invention.

FIG. 2 is a diagram illustrating a structure of a signal transmission/reception apparatus of a communication system according to an exemplary embodiment of the present invention.

Referring to FIG. 2, the signal transmission/reception apparatus includes a Radio Frequency (RF) receiver 211, a frequency down converter 213, an Analog to Digital converter (A/D converter) 215, an echo signal removing coefficient calculator 217, an echo signal remover 219, a frequency up converter 221, a Digital to Analog converter (D/A converter) 223, and an RF transmitter 225.

As stated above, in this exemplary description of the present invention, it is assumed that the signal transmission/reception apparatus is an RS. Accordingly, the RS can transmit a signal received from a BS to an MS and transmit a signal received from the MS to the BS.

The RF receiver 211 is connected to a reception antenna, receives a signal using the reception antenna, and outputs the received signal to the frequency down converter 213.

The frequency down converter 213 down converts the signal output from the RF receiver 211 into a base band signal or an Inter Frequency (IF) band signal, and outputs the frequency down converted signal to the A/D converter 215.

The A/D converter 215 converts the frequency down converted signal, which is down converted as an analog signal, to a digital signal and outputs the digital signal to the echo signal removing coefficient calculator 217 and the echo signal remover 219.

The echo signal removing coefficient calculator 217 determines an echo signal removing coefficient of a current time duration using a signal output from the A/D converter 215. The echo signal removing coefficient calculator 217 also determines an echo signal removing coefficient of a prior time duration using a signal output from the echo signal remover 219. In an exemplary implementation, the time duration may be a symbol duration.

The echo signal removing coefficient calculator 217 can determine an echo channel impulse response using a signal output from the A/D converter 215. Also, the echo signal removing coefficient calculator 217 may determine an echo signal removing coefficient to be output to the echo signal remover 219 in a current time duration by applying a weight to each echo channel impulse response as well as applying a weight to the echo signal removing coefficient output from the echo signal remover 219. Here, the echo signal removing coefficient output from the echo signal remover 219 to which the weight is applied is an echo signal removing coefficient used in the echo signal remover 219 in a prior time duration, i.e., in a prior symbol time duration.

The echo signal remover 219 outputs an echo signal removing coefficient, used in a prior symbol time duration, to the echo signal removing coefficient calculator 217. The echo signal remover 219 receives an echo signal removing coefficient to be used in a current symbol time duration from the echo signal removing coefficient calculator 217, and removes an echo signal from a signal output from the A/D converter 215. For example, the echo signal remover 219 can include an echo signal removing filter, and remove an echo signal mixed with a reception signal by applying the echo signal removing coefficient to the echo signal removing filter.

The frequency up converter 221 up converts the signal in which the echo signal is removed, and outputs the up converted signal to the D/A converter 223.

The D/A converter 223 converts the signal that was up converted as a digital signal to an analog signal and outputs the analog signal to the RF transmitter 225.

The RF transmitter 225 transmits the analog signal using a transmission antenna.

Figure 3:
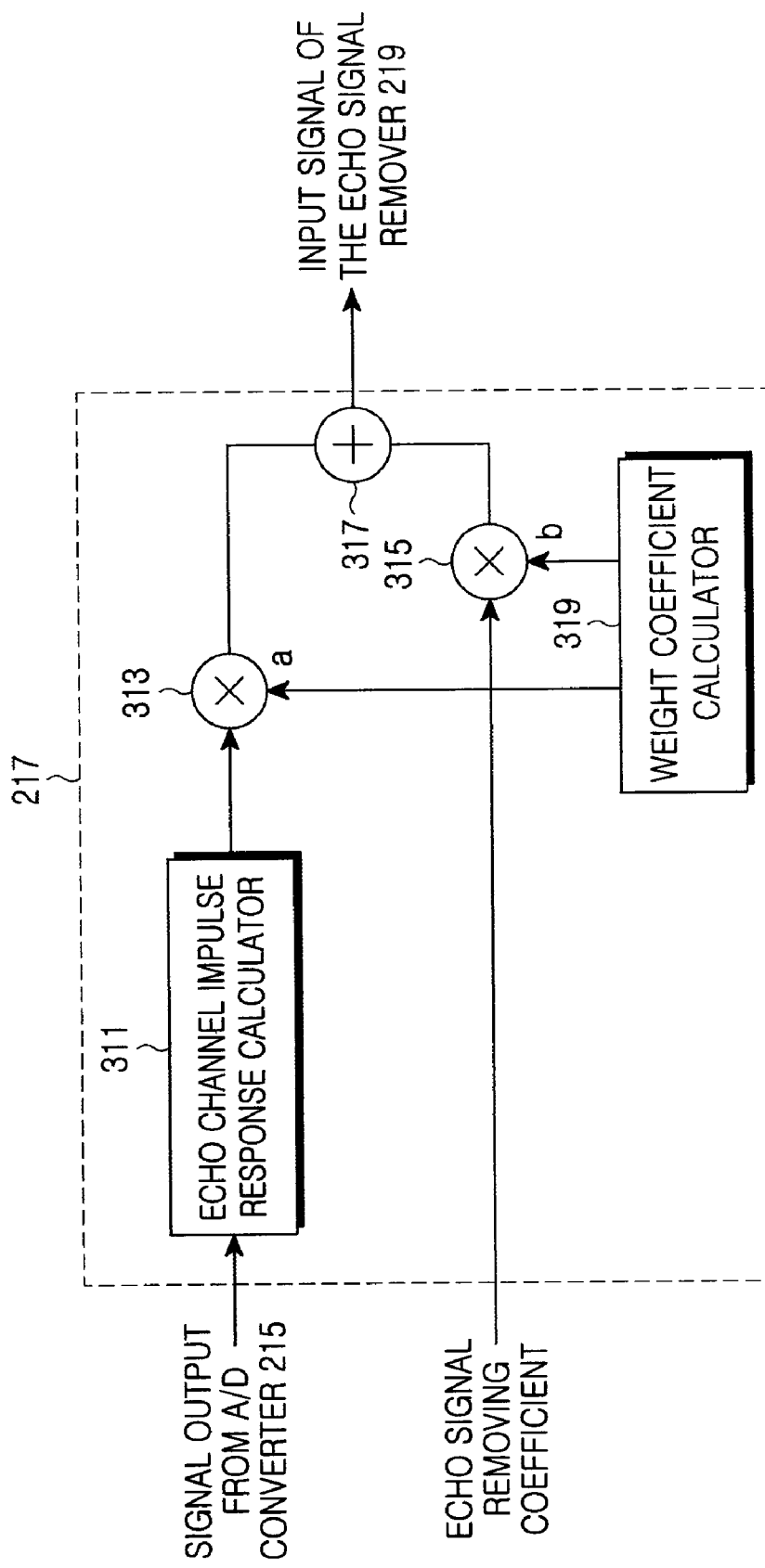
FIG. 3 is a diagram illustrating a structure of an echo signal removing coefficient calculator according to an exemplary embodiment of the present invention.

FIG. 3 is a diagram illustrating a structure of an echo signal removing coefficient calculator according to an exemplary embodiment of the present invention.

Referring to FIG. 3, the echo signal removing coefficient calculator 217 includes an echo channel impulse response calculator 311, a first multiplier 313, a second multiplier 315, an adder 317, and a weight coefficient calculator 319.

The echo channel impulse response calculator 311 determines an echo channel impulse response using a signal output from the A/D converter 215. A more detailed description of an exemplary operation of the echo channel impulse response calculator 311 will be provided below.

The weight coefficient calculator 319 determines a weight coefficient for updating an echo signal removing coefficient. The weight coefficient calculator 319 determines a first weight coefficient to be output to the first multiplier 313 and determines a second weight coefficient to be output to the second multiplier 315.

The weight coefficient calculator 319 outputs the first weight coefficient to the first multiplier 313, outputs the second weight coefficient to the second multiplier 315 and may determine the first weight coefficient and second weight coefficient using various schemes. It will be assumed that the first weight coefficient is set to '1' (a=1), or that the first weight coefficient is set by subtracting the second weight coefficient from 1 (a=1−b).

The second weight coefficient is set to a value less than the first weight coefficient when channel quality is relatively poor, for example, when a Signal to Noise Ratio (SNR) is less than a threshold SNR. In this case, influence due to Noise is decreased, so it is easier to detect a reception signal when the SNR is relatively small.

The second weight coefficient is set to a value greater than the first weight coefficient when a channel for updating an echo signal removing coefficient is changed quickly, or an SNR of a reception signal is equal to or greater than the threshold SNR. In this case, it is easier to detect a reception signal having a time varying characteristic The first multiplier 313 receives the echo channel impulse response output from the echo channel impulse response calculator 311 and the first weight coefficient output from the weight coefficient calculator 319, multiplies the echo channel impulse response by the first weight coefficient, and outputs the multiplied result to the adder 317.

The second multiplier 315 receives an echo signal removing coefficient used in a prior symbol duration and the second weight coefficient output from the weight coefficient calculator 319, multiplies the echo signal removing coefficient used in the prior symbol duration by the second weight coefficient, and outputs the multiplied result to the adder 317. In an exemplary implementation, the echo signal removing coefficient used in the prior symbol duration may include an echo signal removing coefficient used in the previous symbol duration, that is, the symbol duration that is prior by '1' symbol duration from the current symbol duration. Here, the '1' is an integer including '0', and the echo signal removing coefficient is received from the echo signal remover 219.

The adder 317 generates an echo signal removing coefficient by adding the signal output from the first multiplier 313 and the signal output from the second multiplier 315, and outputs the echo signal removing coefficient to the echo signal remover 219. That is, the echo signal removing coefficient generated in the adder 317 is an input signal of the echo signal remover 219.

In an exemplary embodiment, the echo signal removing coefficient generated in the adder 317 can be expressed by Equation (1) below.

$$e_n[m] = \alpha \cdot e_{n-l}[m] + b \cdot \tilde{f}_n[m] \tag{1}$$

In equation 1, $e_n[m]$ represents the echo signal removing coefficient, n represents an index of multicarrier symbol duration in which the echo signal removing coefficient is generated, $\alpha$ represents the first weight coefficient, $e_{n-l}[m]$ represents an echo signal removing coefficient of a current symbol duration, i.e., multicarrier symbol duration that is prior by '1' symbol duration from an $n^{th}$ multicarrier symbol duration, b represents the second weight coefficient, $\tilde{f}_n[m]$ represents an echo channel impulse response estimated in the $n^{th}$ multicarrier symbol duration, and m represents the number of channel frequency response for k tones.

In an exemplary implementation, the echo signal removing coefficient calculator 217 may perform the function of the echo channel impulse response calculator 311. In this case, the echo signal removing coefficient calculator 217 receives a signal output from the A/D converter 215, and determines an echo channel impulse response using the signal output from the A/D converter 215.

The echo signal removing coefficient calculator 217 determines an echo signal removing coefficient using the echo channel impulse response of the echo channel impulse response calculator 311. The echo signal removing coefficient calculator 217 outputs the echo signal removing coefficient to the echo signal remover 219 for the echo signal remover 219 to remove the echo signal.

Figure 4:
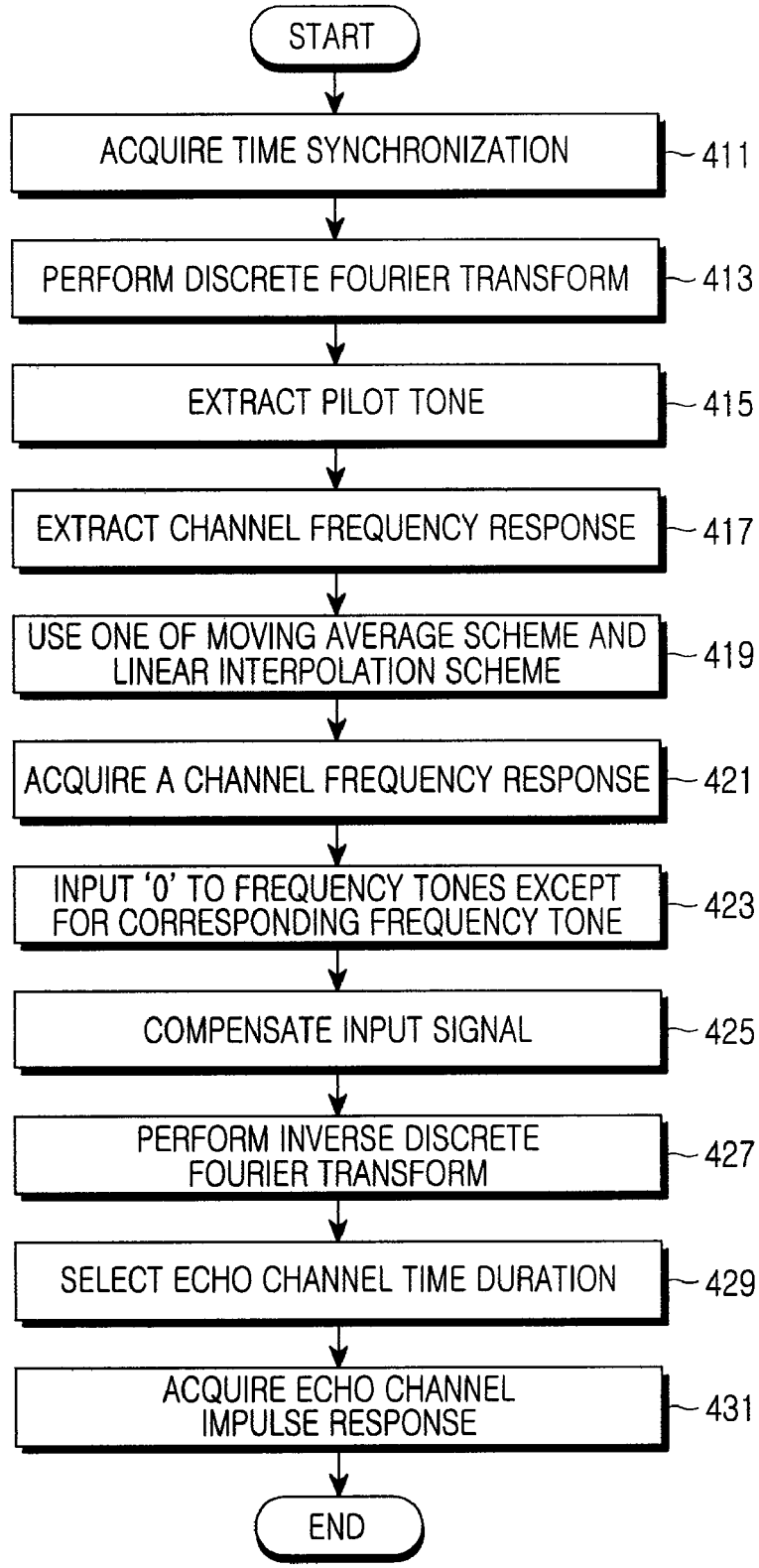
FIG. 4 is a flow chart illustrating an operation of an echo channel impulse response calculator according to an exemplary embodiment of the present invention.

FIG. 4 is a flow chart illustrating an operation of an echo channel impulse response calculator according to an exemplary embodiment of the present invention.

Referring to FIG. 4, in step 411, the echo channel impulse response calculator 311 acquires time synchronization using a signal output from the A/D converter 215. In step 413, the echo channel impulse response calculator 311 performs a Discrete Fourier Transform (DFT) on the signal output from the A/D converter 215. In another exemplary embodiment, the echo channel impulse response calculator 311 can perform a Fast Fourier Transform (FFT) on the signal output from the A/D converter 215 in step 413 as opposed to a DFT. When the transformed signal in the echo channel impulse response calculator 311 includes a preamble sequence or a MAP message, pilot tone modulation information and pilot tone location information is included in the preamble sequence or the MAP message. Therefore, the echo channel impulse response calculator 311 extracts the pilot tone modulation information and pilot tone location information when the transformed signal includes the preamble sequence or the MAP message. The echo channel impulse response calculator 311 may store the pilot tone modulation information and pilot tone location information on an internal memory of the echo channel impulse response calculator 311 (not shown in FIG. 4), an internal memory of the signal transmission/reception apparatus (not shown in FIG. 4) and the like.

In step 415, the echo channel impulse response calculator 311 extracts a pilot tone of the transformed signal. Here, the echo channel impulse response calculator 311 extracts the pilot tone for each symbol using the pilot tone location information. The echo channel impulse response calculator 311 recovers a modulation phase and a magnitude of the pilot signal using the pilot tone modulation information.

In step 417, the echo channel impulse response calculator 311 extracts a channel frequency response. In step 419, the echo channel impulse response calculator 311 can use a moving average scheme that calculates an average of a frequency corresponding to each symbol using a moving symbol duration to minimize influence of noise in a channel frequency response. Further, the echo channel impulse response calculator 311 can use an interpolation scheme to use a sufficient number of channel frequency responses.

For example, when the echo channel impulse response calculator 311 uses a linear interpolation scheme, a channel frequency response acquirable using neighboring pilot tones can be expressed by Equation (2) below.

$$\hat{C}[k+iL] = \frac{i}{m}C[k] + \frac{m-i}{m}C[k+K], \; 0 \le i \le m \quad (2)$$

In Equation (2), k represents a frequency index of a pilot tone, C[k] represents a channel frequency response estimated in the $k^{th}$ pilot tone, K represents a frequency interval between neighboring pilot tones and C[k+K] represents a channel frequency response estimated in a pilot tone neighboring the $k^{th}$ pilot tone.

The channel frequency response acquired using Equation (2) has L pilot tone intervals, that is, K=mL. In Equation (2), the channel frequency response is acquired using the linear interpolation scheme. However, it is also possible to estimate the channel frequency response using one of a polynomial interpolation scheme, a Gaussian interpolation scheme, etc. according to an SNR or a channel frequency response characteristic.

In step 421, the echo channel impulse response calculator 311 acquires a channel frequency response according to locations of each pilot tone. The echo channel impulse response calculator 311 can acquire the channel frequency response using the pilot tone, modulation phase of the pilot tone, magnitude of the pilot tone and the like.

Otherwise, the channel frequency response acquired using the pilot tone for determining the echo channel impulse response must be changed as a form of an echo channel impulse response. Here, it is possible to obtain influence of only an echo channel, i.e., an echo signal among total channel frequency responses by estimating previously a channel frequency response between a BS and an RS in a downlink.

A relationship between the channel estimation frequency response and the echo channel can be expressed by Equation (3) below.

$$\hat{C}[k] = \frac{H[k]}{1-F[k]\exp[-j2\pi kd/N]} \quad (3)$$

In Equation (3), $\hat{C}[k]$ represents a channel frequency response estimated and interpolated in the $k^{th}$ pilot tone, F[k] represents a frequency response in an echo channel, H[k] represents a frequency response between a transmitter, for example, a BS, transmitting a reference pilot signal, and an RS, and d represents a total processing delay for the RS including an A/D converter, a band pass filter, etc. as a phase rotation component. Further, H[k] can be acquired using an additional estimation process in a communication system using a carrier.

The frequency response of the echo channel can be expressed by Equation (4) below.

$$\hat{F}[k] = \left(1 - \frac{H[k]}{C[k]}\right)\exp[j\pi kd/N] \quad (4)$$

In step 423, the echo channel impulse response calculator 311 changes the channel frequency response to a time response considering time, inputs the time response to a location of a corresponding frequency tone in order of time, and inputs '0' to frequency tones except for the corresponding frequency tone.

In step 425, the echo channel impulse response calculator 311 compensates an input signal.

In step 427, the echo channel impulse response calculator 311 performs an Inverse Discrete Fourier Transform (IDFT) on the compensated signal. Although not described in FIG. 4, the echo channel impulse response calculator 311 may perform an Inverse Fast Fourier Transform (IFFT) on the compensated signal in step 427 according to an exemplary embodiment of the invention.

Here, the echo channel impulse response acquired by performing the IDFT can be expressed by Equation (5) below.

$$\hat{f}[m+d] = \frac{N}{N_{pilot}}IFFT\{\hat{F}[k]\} \quad (5)$$

$$= \frac{1}{N_{pilot}}\sum_{k}\left(1-\frac{H[k]}{C[k]}\right)\exp[j\pi kdm/N]$$

In Equation (5), N represents an input point of the DFT, and $N_{pilot}$ represents the number of the channel frequency response used for the determination, except for '0'.

In step 429, the echo channel impulse response calculator 311 selects an echo channel time duration.

In step 431, the echo channel impulse response calculator 311 acquires an echo channel impulse response in the selected echo channel time duration. The echo channel impulse response calculator 311 selects an echo channel impulse response in a corresponding time duration among total echo channel impulse responses considering a time delay and a length of an echo signal.

Otherwise, the pilot tone is periodically transmitted in a communication system using a multicarrier. So, the echo channel impulse response calculator 311 acquires continuously an echo channel impulse response using the pilot tone.

A relationship between a channel frequency response and an echo channel using Equation (3) can be expressed by Equation (6) below.

$$C_n[k] = \frac{H_n[k]}{1-(F_n[k]-E_n[k])\exp[-j2\pi kd/N]} \quad (6)$$

In Equation (6), $C_n[k]$ represents a combined channel frequency response acquirable in the $n^{th}$ multicarrier symbol, $H_n[k]$ represents an input channel in the $n^{th}$ multicarrier symbol duration, $F_n[k]$ represents an echo channel in the $n^{th}$ multicarrier symbol duration, and $E_n[k]$ represents a frequency response of the echo signal remover 219 applied in the $n^{th}$ multicarrier symbol duration.

Here, $E_n[k]$ includes a delay for echo channel estimation, and can be acquired using an echo channel response $\hat{F}_{n-1}[k]$ estimated in 1 prior symbol duration.

The echo channel impulse response can be expressed by Equation (7) below.

$$\tilde{f}_n[m] = f_n[m] - \hat{f}_{n-1}[m] \quad (7)$$

In equation (7), $\tilde{f}_n[m]$ represents an echo channel impulse response estimated in the $n^{th}$ multicarrier symbol duration of a signal in which a pilot signal is continuously transmitted. Here, the echo channel impulse response is used for updating a coefficient of the echo signal remover 219 in Equation (1). That is, the echo channel impulse response is used for determining an echo signal removing coefficient as expressed in Equation (1), especially, the second weight coefficient is multiplied by the echo channel impulse response.

As is apparent from the foregoing description, according to exemplary embodiments of the present invention, a signal transmission/reception apparatus of a communication system can remove an echo signal. Further, the signal transmission/reception apparatus can remove the echo signal using the training sequence. Accordingly, because an oscillation is prevented from occurring in the signal transmission/reception apparatus, the case that the quality of a signal transmitted by the signal transmission/reception apparatus is deteriorated is addressed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for removing an echo signal in a signal transmission/reception apparatus of a communication system, the method comprising:
   determining an echo channel impulse response using a reception signal;
   generating an echo signal removing coefficient using the echo channel impulse response;
   removing an echo signal from the reception signal using the echo signal removing coefficient; and
   transmitting the reception signal in which the echo signal is removed, wherein the determining of the echo channel impulse response using the reception signal comprises:
   extracting a pilot tone using the reception signal;
   extracting a channel frequency response using the pilot tone;
   inserting the channel frequency response into a first frequency tone in a corresponding location, and inserting 0 into frequency tones except for the first frequency tone; and
   acquiring the echo channel impulse response by performing an Inverse Discrete Fourier Transform (IDFT) on the frequency tones into which 0 is inserted.

2. The method of claim 1, wherein the pilot tone is extracted from a reception signal on which a Discrete Fourier Transform (DFT) is performed.

3. The method of claim 1, wherein the pilot tone is extracted using location information acquired from one of a preamble sequence included in the reception signal and a MAP message included in the reception signal.

4. The method of claim 1, wherein the channel frequency response is acquired from the pilot tone using one of a moving average scheme and an interpolation scheme.

5. A method for removing an echo signal in a signal transmission/reception apparatus of a communication system, the method comprising:
   determining an echo channel impulse response using a reception signal;
   determining a first weight coefficient and a second weight coefficient to generate an echo signal removing coefficient, wherein the second weight coefficient is less than the first weight coefficient when a Signal-to-Noise Ratio (SNR) is less than a threshold SNR;
   detecting a first weight result value by multiplying an echo signal removing coefficient of a prior symbol duration by the first weight coefficient;
   detecting a second weight result value by multiplying the echo channel impulse response by the second weight coefficient;
   generating the echo signal removing coefficient by adding the first weight result value with the second weight result value;
   removing the echo signal from the reception signal using the echo signal removing coefficient; and
   transmitting the reception signal in which the echo signal is removed.

6. The method of claim 5, wherein the determining of the echo channel impulse response using the reception signal comprises:
   acquiring a frequency response of an echo signal remover used in the signal transmission/reception apparatus using an echo channel response estimated in a prior symbol duration; and
   detecting the echo channel impulse response using the frequency response of the echo signal remover.

7. An apparatus for removing an echo signal in a signal transmission/reception apparatus of a communication system, the apparatus comprising:
   a receiver for receiving a signal;
   an echo signal removing coefficient calculator for determining an echo channel impulse response using the received signal and for generating an echo signal removing coefficient using the echo channel impulse response;
   an echo signal remover for removing an echo signal from the received signal using the echo signal removing coefficient; and
   a transmitter for transmitting the reception signal in which the echo signal is removed,
   wherein the echo signal removing coefficient calculator comprises an echo channel impulse response calculator for extracting a pilot tone using the reception signal, for extracting a channel frequency response using the pilot tone, for inserting the channel frequency response into a first frequency tone in a corresponding location, for inserting 0 into frequency tones except for the first frequency tone and for acquiring the echo channel impulse response by performing an Inverse Discrete Fourier Transform (IDFT) on the frequency tones into which 0 is inserted.

8. The apparatus of claim 7, wherein the echo channel impulse response calculator extracts the pilot tone by performing a Discrete Fourier Transform (DFT) on the received signal.

9. The apparatus of claim 7, wherein the echo channel impulse response calculator extracts the pilot tone using location information acquired from one of a preamble sequence included in the reception signal and a MAP message included in the reception signal.

10. The apparatus of claim 7, wherein the echo channel impulse response calculator acquires the channel frequency response from the pilot tone using one of a moving average scheme and an interpolation scheme.

11. An apparatus for removing an echo signal in a signal transmission/reception apparatus, the apparatus comprising:
a receiver for receiving a signal;
an echo signal removing coefficient calculator for determining an echo channel impulse response using the received signal and for generating an echo signal removing coefficient using the echo channel impulse response;
an echo signal remover for removing an echo signal from the receiving signal using the echo signal removing coefficient; and
a transmitter for transmitting the reception signal in which the echo signal is removed,
wherein the echo signal removing coefficient calculator comprises:
a weight coefficient calculator for determining a first weight coefficient and a second weight coefficient to generate the echo signal removing coefficient, wherein the second weight coefficient is less than the first weight coefficient when a Signal-to-Noise Ratio (SNR) is less than a threshold SNR;
a first multiplier for detecting a first weight result value by multiplying an echo signal removing coefficient of a prior symbol duration by the first weight coefficient;
a second multiplier for detecting a second weight result value by multiplying the echo channel impulse response by the second weight coefficient; and
an adder for generating the echo signal removing coefficient by adding the first weight result value with the second weight result value.

12. The apparatus of claim 11, wherein the echo signal removing coefficient calculator acquires a frequency response of an echo signal remover used in the signal transmission/reception apparatus using an echo channel response estimated in a prior symbol duration, and detects the echo channel impulse response using the frequency response of the echo signal remover.

* * * * *